United States Patent
Olivieri et al.

(10) Patent No.: US 9,365,078 B2
(45) Date of Patent: Jun. 14, 2016

(54) BEARING-HUB ASSEMBLY WITH A LIGHT ALLOY HUB

(71) Applicants: Davide Antonio Olivieri, Turin (IT); Laura Sguotti, Pinerolo (IT)

(72) Inventors: Davide Antonio Olivieri, Turin (IT); Laura Sguotti, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/534,719

(22) Filed: Nov. 6, 2014

(65) Prior Publication Data
US 2015/0123455 A1    May 7, 2015

(30) Foreign Application Priority Data
Nov. 7, 2013    (IT) .............................. TO2013A0904

(51) Int. Cl.
*B60B 27/00* (2006.01)
*F16C 33/64* (2006.01)

(52) U.S. Cl.
CPC ............. *B60B 27/0005* (2013.01); *B60B 27/00* (2013.01); *B60B 27/0084* (2013.01); *B60B 27/0094* (2013.01); *F16C 33/64* (2013.01); *B60B 2310/3142* (2013.01); *B60B 2360/104* (2013.01); *B60B 2380/12* (2013.01); *B60B 2380/73* (2013.01); *B60B 2380/76* (2013.01); *B60B 2380/82* (2013.01); *B60B 2900/111* (2013.01)

(58) Field of Classification Search
CPC ........ B60B 27/00; B60B 27/0005; B60B 3/04
USPC .............................. 301/109, 105.1, 124.1, 6.8
See application file for complete search history.

(56) References Cited

U.S. PATENT DOCUMENTS

| | | | | |
|---|---|---|---|---|
| 4,383,588 A * | 5/1983 | Krude | ................. | B60B 27/0005 384/537 |
| 4,715,780 A * | 12/1987 | Kan | .................... | B29C 45/1459 384/492 |
| 4,765,688 A * | 8/1988 | Hofmann | ............ | B60B 27/0005 301/124.1 |
| 4,792,020 A * | 12/1988 | Okumura | ............ | B60B 27/0005 301/6.8 |
| 5,674,011 A * | 10/1997 | Hofmann | ............ | B60B 27/0005 384/448 |
| 5,764,049 A * | 6/1998 | Hofmann | ............ | B60B 27/0005 324/173 |
| 6,232,772 B1 * | 5/2001 | Liatard | ................... | G01P 3/443 324/174 |
| 6,322,253 B1 * | 11/2001 | Picca | ..................... | B60B 27/00 384/513 |
| 7,118,182 B2 * | 10/2006 | Kayama | ................. | B60B 27/00 180/252 |
| 7,618,191 B2 * | 11/2009 | Haepp | .................. | F16C 19/185 384/448 |

(Continued)

FOREIGN PATENT DOCUMENTS

| | | | |
|---|---|---|---|
| EP | 1031439 B1 | 4/2005 | |
| EP | 2378143 A1 | 10/2011 | |

(Continued)

*Primary Examiner* — Hau Phan
(74) *Attorney, Agent, or Firm* — Bryan Peckjian; SKF USA Inc. Patent Dept.

(57) ABSTRACT

A bearing-hub assembly having a rolling bearing provided with a stationary radially outer ring, at least one rotatable radially inner ring and at least one row of rolling bodies is provided. The bearing-hub assembly includes a light alloy hub, provided with a flanged portion and a cylindrical housing. The cylindrical housing is axially located inside the radially inner ring and is provided with an external lateral surface having a complementary shape with an internal lateral surface of the radially inner ring.

4 Claims, 1 Drawing Sheet

(56) References Cited

U.S. PATENT DOCUMENTS

| | | | |
|---|---|---|---|
| 7,758,432 B2* | 7/2010 | Arrieta | F16D 3/2237 464/178 |
| 8,480,306 B2* | 7/2013 | Fukumura | B60B 27/00 29/898.06 |
| 8,944,523 B2* | 2/2015 | Re | B22D 19/04 301/109 |
| 2005/0163410 A1* | 7/2005 | Sakamoto | B60B 3/16 384/544 |
| 2007/0098315 A1* | 5/2007 | Komori | B60B 27/00 384/544 |
| 2008/0144985 A1* | 6/2008 | Joki | B60B 3/04 301/109 |
| 2010/0021099 A1* | 1/2010 | Torii | B60B 27/0005 384/544 |

FOREIGN PATENT DOCUMENTS

| | | |
|---|---|---|
| EP | 2505380 A1 | 10/2012 |
| EP | 2505383 A1 | 10/2012 |
| WO | 2010063299 A1 | 6/2010 |

* cited by examiner

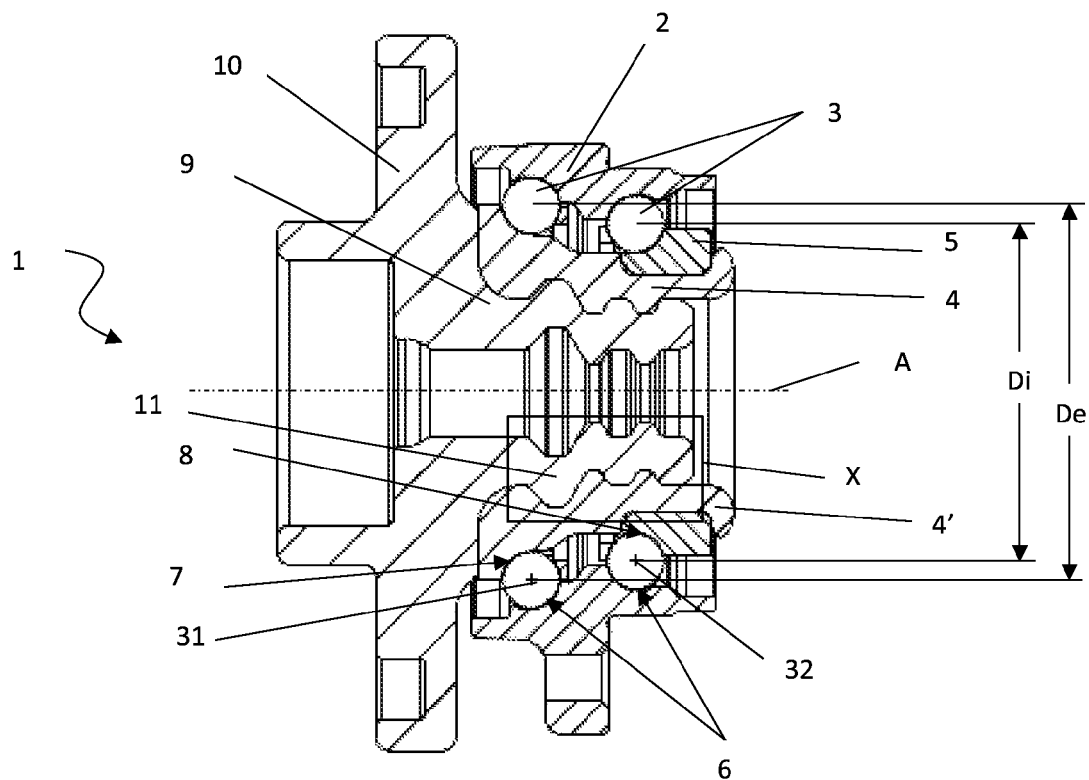
Fig. 1
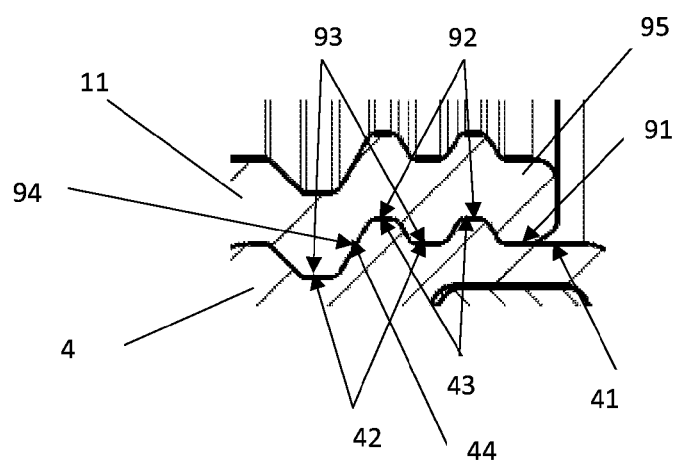
Fig. 2 – Det. X

BEARING-HUB ASSEMBLY WITH A LIGHT ALLOY HUB

FIELD OF THE INVENTION

The present invention is related to a bearing-hub assembly having a light alloy hub, for example an aluminum hub. The assembly is particularly suitable for applications having a rotatable hub, since the hub is engaged with a rotatable element, for example a motor-vehicle wheel, and having the hub steadily coupled with a bearing inner ring.

BACKGROUND OF THE INVENTION

In the state of the art, flanged bearing-hub assemblies for motor-vehicle driving wheel applications are known. An example is described in the European patent EP 1031439 B1, such embodiment comprising a radially outer ring, a pair of radially inner rings and two rows of rolling bodies (in the example, spheres), radially interposed between the outer ring and the pair of inner rings. The outer ring has an external cylindrical surface, suitable for press fit operations, to insert the bearing into a cylindrical seat, formed in a suspension knuckle. The radially inner rings are press fit on a flanged hub, which is angularly connected in a known way with the end portion of a spindle, in other words an axle shaft of a motor-vehicle powertrain. The rings are typically made of high resistance steel for rolling bearings, since the ring must support high hertzian loads, which are transmitted between rolling bodies and raceways.

The bearing-hub assembly also comprises a hub, which has a flange portion inside of which holes are provided for a plurality of fastening means (for instance, bolts), which connect in a known way an element of the motor-vehicle wheel, for example the brake disc, to the flanged hub.

The flanged hub can also be defined as assembly structural portion, since it supports loads transmitted by the element of the motor-vehicle wheel. Advantageously, the flanged hub can be made of light alloy, anyway of a lighter material than the hertzian portion material, in order to decrease the assembly overall weight. According to state of art teaching, the hub can be co-molded to the hertzian portion, in other words to a rolling ring.

Several co-molding technologies require the light alloy to be transformed in a state different from the solid state, by means of a light alloy heating. The hertzian portion material has a different thermal behavior with respect to the structural portion material (as known a light alloy, for example aluminum, has a greater thermal dilatation than the steel one). Therefore, particularly in applications with a hub rotatable and steadily engaged to the bearing inner ring, it is particularly difficult to ensure that the two portions remain perfectly adherent each other, that is to say, they do not disjoin neither after cooling nor during working operations.

SUMMARY OF THE INVENTION

Aim of the present invention is to realize a bearing-hub assembly comprising a light alloy hub, the assembly overcoming the above described inconveniences.

According to the present invention, a bearing-hub assembly, with an aluminum or other light alloy hub, is described.

Further embodiments of the invention, preferred and/or particularly advantageous, are described according to the characteristics as in the enclosed dependent claims

BRIEF DESCRIPTION OF THE DRAWINGS

A preferred embodiment of the invention will be now described, in an exemplifying and not limitative way, by reference to the enclosed drawing, in which:

FIG. 1 is an axisymmetric section of the bearing-hub assembly, according to a preferred embodiment of the present invention;

FIG. 2 is a detail of FIG. 1 showing the coupling surfaces between the hub and the radially inner ring.

DETAILED DESCRIPTION OF THE INVENTION

With reference to FIG. 1, a bearing-hub assembly 1 is shown and comprises a radially outer ring 2, stationary, a radially inner ring 4 and an annular insert 5, both rotatable, and two rows 31, 32 of rolling bodies 3 (in this example spheres). The rolling bodies of the two rows 31, 32 are radially interposed, respectively, between the outer ring 2 and the inner ring 4 and between the outer ring 2 and the annular insert 5. The insert 5 can be considered as a second radially inner ring and, to the aims of the present invention, so as in this embodiment, can be contained inside the inner ring 4, in a way which will be further described, or can be put aside the inner ring 4 or can be missed at all.

Throughout the present description and in the claims, the terms and expressions indicating positions and orientations such as "radial" and "axial" are to be taken to refer to the axis of rotation A of the assembly 1. Instead, expressions as "axially external" and "axially internal" are to be referred to the assembled condition, in this case respectively to a motor-vehicle wheel side and to an opposite side.

The radially outer ring 2 comprises an annular portion, in which the raceways 6 for the rolling bodies 3 are provided. In the non-limitative embodiment of FIG. 1, the rolling bodies 3 also rotate on the raceways 7, 8 of the radially inner rings 4, 5. In particular, the two rows 31 and 32 of rolling bodies 3 are distinguished, with respect to the rotation axis A, in an axially outer row 31 and in an axially inner row 32. While the axially outer raceway 7 is in one piece with the inner ring 4, the axially inner raceway 8 is realized on the annular insert 5. The annular insert 5 is engaged to the inner ring 4 by means of a rolled edge 4', which is located at an inner ring 4 end and extends radially outwards and axially close to the annular insert 5.

In the above described rolling bearing, the diameter De of the centers of the spheres 3 of the more axially external row 31 is greater than the diameter Di of the centers of the spheres 3 of the more axially internal row 32. This is the configuration of an asymmetric rolling bearing, which presents functional advantages with respect to symmetric bearings, bearings having the diameter De equal to the diameter Di. Of course, the embodiment of the asymmetric bearing is only exemplifying, since the present invention is also suitable for symmetric rolling bearings.

On the radially inner ring 4, a light alloy hub 9 is assembled. The hub comprises a flange portion 10 and a cylindrical body 11, in one piece with the flange portion and made of the same material.

With reference to FIG. 2, the cylindrical body 11 is located radially inside the inner ring 4 and presents an external lateral surface 91, having a complementary shape with an internal lateral surface 41 of the inner ring 4, in other words, the assembly hertzian portion.

According to the present invention, the complex co-molding operation can be avoided. In fact, the hub 9 is cold formed, close to the inner ring 4. In particular, the radially internal surface 41 of the radially inner ring 4 is provided with annular grooves 42, which are alternated to annular protrusions 43. Due to cold forming, the radially external surface 91 of the hub 9 perfectly copies the profile of the radially internal surface 41 of the inner ring 4 and therefore in the grooves 42 correspondent protrusions 93 of the hub 9 will be engaged. At the same time, the protrusions 43 of the inner ring 4 will engage correspondent grooves 92 of the hub 9.

The hub cold forming process can be carried out, by using different known technologies, for example, orbital forming, hydro-forming, elastomeric forming.

Therefore, the invented solution allows obtaining a low weight bearing-hub assembly, since the hub is made of light alloy. Moreover, such solution avoids the complex co-molding operation and the consequent risks of detachment of the hub from the inner ring. In fact, the detachment can be due to the shrinkage of the light alloy during solidification. As known, the light alloy has a coefficient of thermal expansion greater than the one of the inner ring material and, consequently, the hub shrinks more than the inner ring. This problem is solved, by adopting the cold forming process.

Finally, adopting a profile with grooves and protrusions also helps during the bearing lifetime. In fact, the assembly use under vehicle working conditions, i.e. at high temperature (anyway, a higher temperature than the cold forming one), the light alloy expands more than the ring material. The adhesion between hub and ring will be then ensured by the contact between surfaces 94 of the hub and surfaces 44 of the inner ring, while the hub will be free expanding in the area of its axially internal edge 95. On the other hand, at a vehicle start, operating the bearing at low temperature (anyway at a lower temperature than the cold forming one), protrusions 43 always act as anchoring points, thus avoiding the detachment between the two components. Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A bearing-hub assembly comprising:
a rolling bearing provided with a stationary radially outer ring, at least one rotatable radially inner ring and at least one row of rolling bodies,
a light alloy hub, having a flanged portion and a cylindrical housing, axially located inside the radially inner ring and provided with an external lateral surface having a complementary shape with an internal lateral surface of the radially inner ring, and wherein along the internal lateral surface of the radially inner ring, a first plurality of annular grooves alternate between a first plurality of annular protrusions.

2. The bearing-hub assembly according to claim 1, wherein along the external lateral surface of the hub a second plurality of annular grooves alternate between a second plurality of annular protrusions and in the first plurality of annular grooves of the radially inner ring the second plurality of annular protrusions of the hub are located, while in the second plurality of annular grooves of the hub the first plurality of annular protrusions of the radially inner ring are located.

3. The bearing-hub assembly according to claim 1, wherein the at least one row of rolling bodies further comprises two rows of rolling bodies having pitch diameters (De, Di) of different size.

4. The bearing-hub assembly according to claim 1, wherein the at least one row of rolling bodies further comprises at least first and second rows of rolling bodies, the bearing-hub assembly further comprising a first radially inner race of the first row of rolling bodies is formed integrated into the radially inner ring, wherein a second radially inner race of the second row of rolling bodies is formed on an annular insert, being part of the radially inner ring and integrated in the radially inner ring by a rolled edge, the rolled edge being located at an inner ring end and protruding radially towards outside and axially towards the annular insert.

* * * * *